(12) United States Patent
Takeda

(10) Patent No.: US 12,028,521 B2
(45) Date of Patent: Jul. 2, 2024

(54) ENCODER, METHOD, AND NON-TRANSITORY COMPUTER-READABLE STORAGE MEDIUM

(71) Applicant: CANON KABUSHIKI KAISHA, Tokyo (JP)

(72) Inventor: Eishi Takeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/883,715

(22) Filed: Aug. 9, 2022

(65) Prior Publication Data

US 2023/0057659 A1 Feb. 23, 2023

(30) Foreign Application Priority Data

Aug. 23, 2021 (JP) ................................ 2021-135803

(51) Int. Cl.
*H04N 19/119* (2014.01)
*H04N 19/162* (2014.01)
*H04N 19/176* (2014.01)
*H04N 19/186* (2014.01)
*H04N 23/667* (2023.01)
*H04N 19/96* (2014.01)

(52) U.S. Cl.
CPC ......... *H04N 19/119* (2014.11); *H04N 19/162* (2014.11); *H04N 19/176* (2014.11); *H04N 19/186* (2014.11); *H04N 23/667* (2023.01); *H04N 19/96* (2014.11)

(58) Field of Classification Search
CPC .. H04N 19/186; H04N 19/119; H04N 19/176; H04N 19/162; H04N 23/667; H04N 19/96
See application file for complete search history.

(56) References Cited

U.S. PATENT DOCUMENTS

| | | | |
|---|---|---|---|
| 2019/0281215 A1* | 9/2019 | Chan | G06T 3/14 |
| 2021/0218968 A1* | 7/2021 | Chernyak | H04N 19/124 |
| 2022/0408020 A1* | 12/2022 | Zhang | H04N 5/77 |
| 2023/0050376 A1* | 2/2023 | Filippov | H04N 19/176 |

FOREIGN PATENT DOCUMENTS

JP 2018-152851 A 9/2018

* cited by examiner

*Primary Examiner* — Tsion B Owens
(74) *Attorney, Agent, or Firm* — Cowan, Liebowitz & Latman, P.C.

(57) ABSTRACT

The present invention provides an encoder which comprises an input portion configured to be input an encoding target image acquired from an image capturing portion, wherein the encoder is arranged to divide the encoding target image into coding units, the coding units including an encoding block of a luma signal and an encoding block of a chroma signal; to acquire characteristics of chroma components of the encoding target image; and to further divide the encoding block of the luma signal and the encoding block of the chroma signal into encoding blocks of a same division structure or different division structures, in accordance with the acquired shooting condition.

5 Claims, 9 Drawing Sheets

LUMA COMPONENT CU

CHROMA COMPONENT CU

LUMA COMPONENT CU

CHROMA COMPONENT CU

ENCODER, METHOD, AND NON-TRANSITORY COMPUTER-READABLE STORAGE MEDIUM

BACKGROUND OF THE INVENTION

Field of the Invention

The present invention relates to an image encoding technique.

Description of the Related Art

In recent years, the amount of data handled by video devices is constantly increasing due to the demand for supporting 4K and 8K resolution or the like. For this end, standardization of Versatile Video Coding (VVC)/MPEG-I Part3 is underway, which is a next-generation video encoding method that allows compression with higher efficiency than H.265/HEVC.

A block division scheme referred to as Chroma Separate Tree (CST) or Dual Tree Structure (DT) is under consideration as one of techniques to be employed as a new encoding tool in the VVC standard.

Although block division of a Coding Tree Unit (CTU) according to the conventional HEVC standard has only one same block division structure for luma component pixel samples and chroma component pixel samples, it has become possible in the VVC standard to choose to have coding tree structures each for luma component samples and chroma component samples independently in intra slices performed by intra predictive encoding.

Generally, a natural image exhibits a smaller change in pixel values of chroma components than luma components, and exhibits a higher spatial redundancy. Therefore, encoding efficiency is expected to improve provided that the number of layers of the tree structure can be reduced by assigning a larger block size to chroma components using the aforementioned CST method, and thus the amount of code data of redundant syntax information indicating division flags and number of layers can be reduced.

Japanese Patent Laid-Open No. 2018-152851 describes a technique for an encoding apparatus including a portion configured to encode by independently performing block division on luma components and chroma components, wherein the technique, providing a portion configured to determine the form of block division of chroma components based on the form of division of the encoded blocks of luma components, determines the form of division of chroma components so that the block boundary of chroma components matches the block boundary of corresponding luma components.

As described in the aforementioned literature, however, when determining the form of block division, an encoder using the CST to perform block division of luma components and chroma components independently compares the cost such as the sum of difference values (SAD) from the generated amount of code or the predictive image for both the case of performing block division of luma components and chroma components in a same form of block and the case of dividing respective components independently. The encoder then compares the results to determine a final method of block division. Therefore, there is a risk of an increased computation load.

SUMMARY OF THE INVENTION

In consideration of the aforementioned problem, the present invention aims to provide a technique for improving the efficiency of image encoding without increasing the computation load in the encoding process.

According to an aspect of the invention, there is provided an encoder comprising: an input portion configured to be input an encoding target image acquired from an image capturing portion; wherein the encoder is arranged to divide the encoding target image into coding units, the coding units including an encoding block of a luma signal and an encoding block of a chroma signal; to acquire characteristics of chroma components of the encoding target image; and to further divide the encoding block of the luma signal and the encoding block of the chroma signal into encoding blocks of a same division structure or different division structures, in accordance with the acquired shooting condition.

According to the present invention, it becomes possible to improve the encoding efficiency of chroma components.

Further features of the present invention will become apparent from the following description of exemplary embodiments with reference to the attached drawings.

DESCRIPTION OF THE EMBODIMENTS

Figure 1:
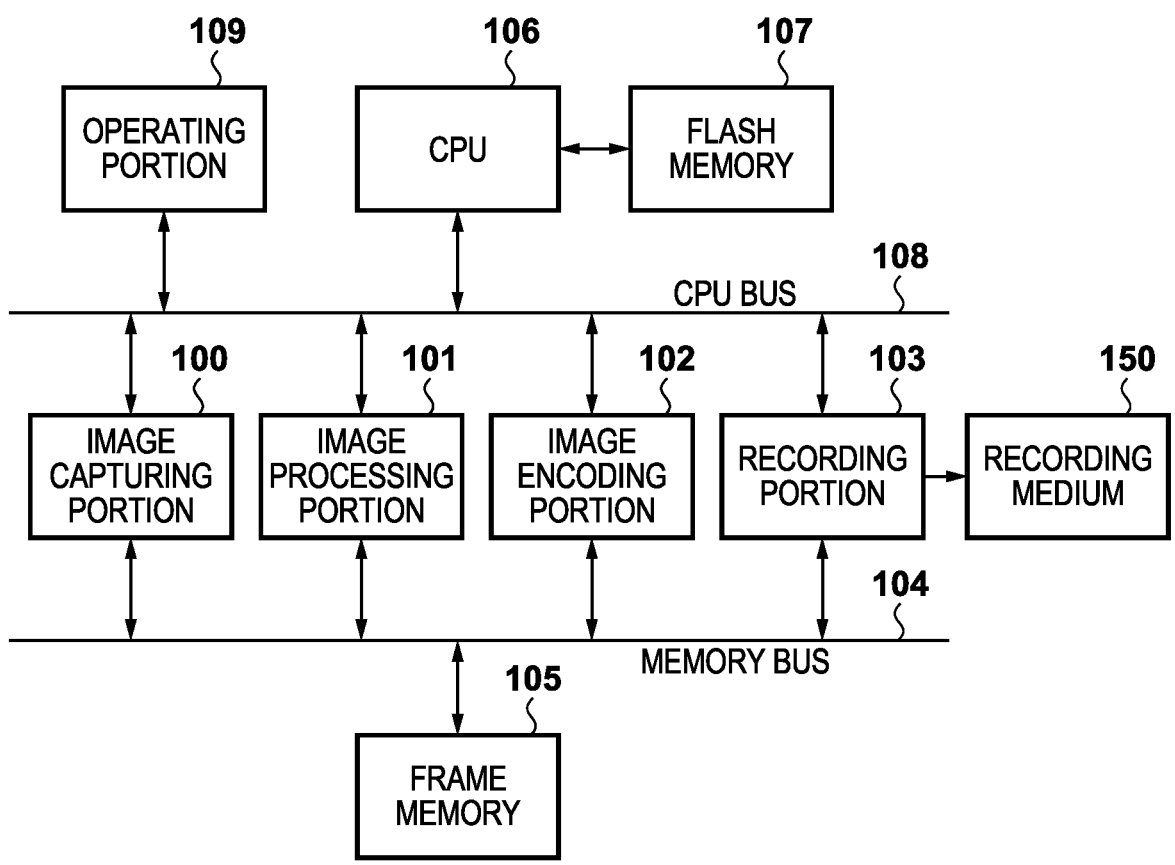
FIG. 1 is a system configuration diagram of an encoding apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 2:
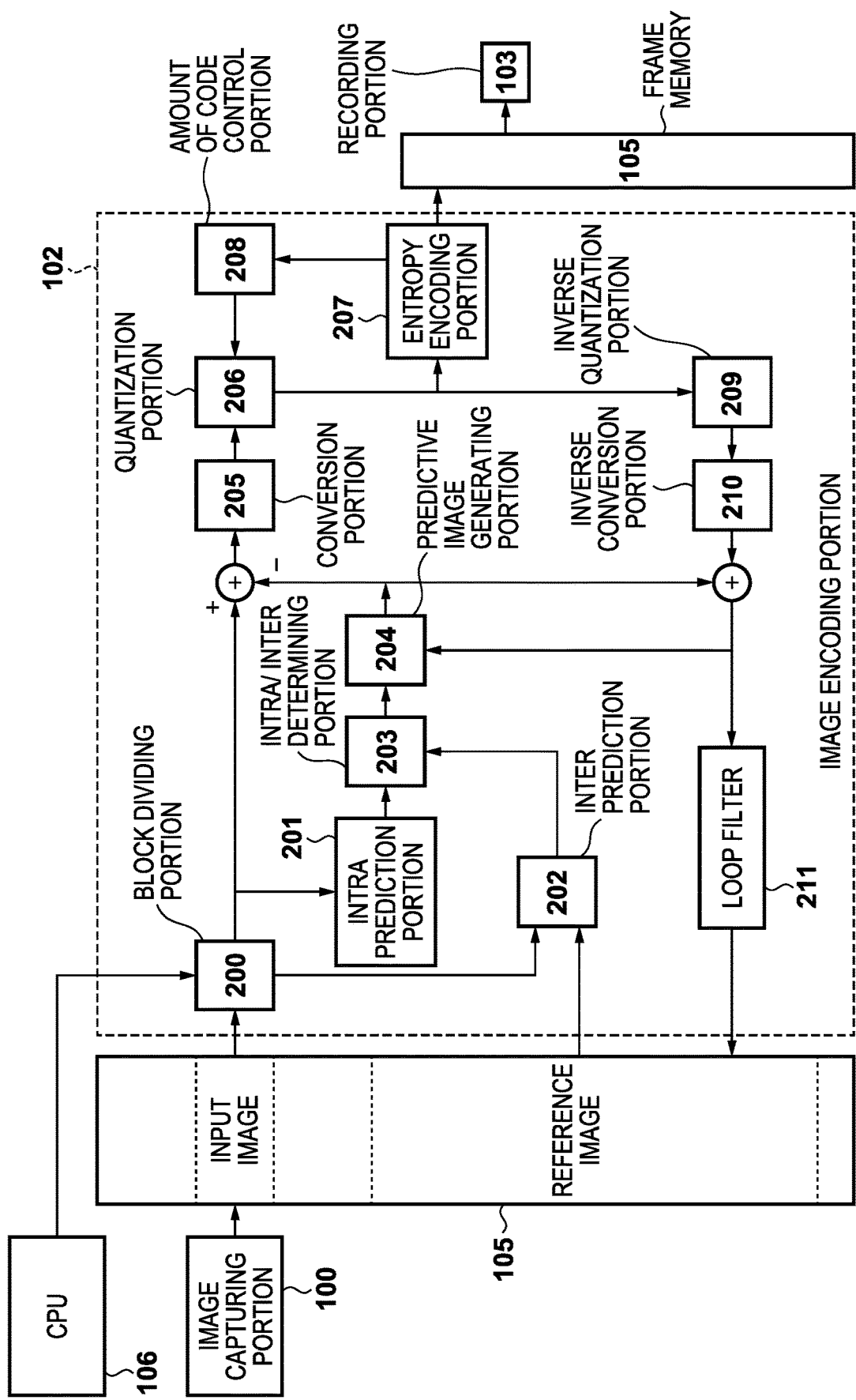
FIG. 2 is a block diagram of an encoding portion according to a first embodiment.
Figure 3:
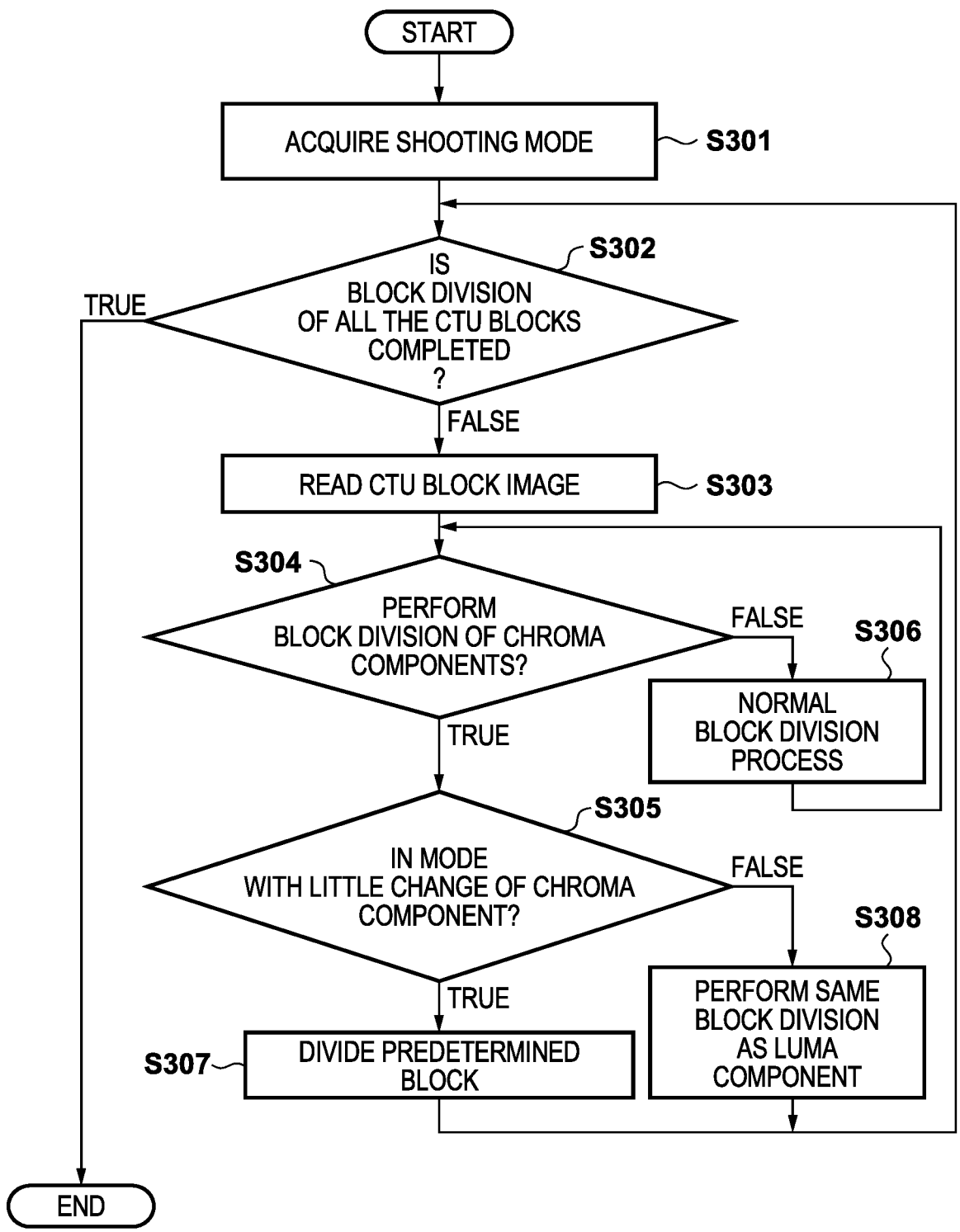
FIG. 3 is a flowchart illustrating a procedure of an encoding process according to the first embodiment.

FIG. 1 illustrates a system configuration diagram of a moving image encoding apparatus to which the present embodiment is applied. In addition, FIG. 2 illustrates a block diagram of an image encoding portion 102 in FIG. 1, and FIG. 3 is a flowchart illustrating the processing procedure thereof <Overall System Configuration>

The moving image encoding apparatus includes an image capturing portion 100, an image processing portion 101, an image encoding portion 102, a recording portion 103, a memory bus 104, a frame memory 105, a CPU 106, a flash memory 107, a CPU bus 108, and an operating portion 109.

The image capturing portion 100 includes a camera portion such as a lens and a CCD, an optical portion, and further an image capturing sensor that converts an optical signal taken from the lens into an electric signal. An imaging surface of the image capturing sensor has three types of filters for colors red, blue and green repeatedly arranged thereon. In the present embodiment, the arrangement is assumed to be a Bayer array. Therefore, the captured image data output from the image capturing portion 100 is image data of a Bayer array. The image capturing portion 100 outputs the image data (digital RAW image data), of a Bayer array acquired by image capturing, to the frame memory 105 such as a large-capacity DRAM via the memory bus 104. Here, it is assumed that the image capturing portion 100 performs image capturing at a frame rate of 30 frames/second, for example.

The image processing portion 101 performs a so-called development process that performs a debayer process (demosaic process) on the RAW image data stored in the frame memory 105 converting into a signal including luma and chroma, then optimizes the image by removing noise included in each signal or correcting optical distortion, and the like. The image processing portion 101 then outputs the image data after the development process to the frame memory 105 again, in order to compress and encode the image data.

The image encoding portion 102 reads the developed image data from the frame memory 105, performs video compression using redundancy of image data due to inter-frame prediction and entropy encoding, and generates and outputs an encoded bit stream. The image encoding portion 102 in the present embodiment is characterized in employing the Versatile Video Codec (VVC) scheme as the video compression scheme.

The recording portion 103 converts the encoded bit stream generated by the image encoding portion 102 into a predetermined container format such as the MP4 or MOV format that preserves playback and edition compatibility across various PC applications, and records the converted stream as a file in a non-volatile recording medium 150 such as a USB, an SD card, or a hard disk.

The memory bus 104 is a data bus that connects between the image capturing portion 100, the image processing portion 101, the image encoding portion 102 and the recording portion 103, and the frame memory 105, and is configured to perform high-speed transfer of image data, encoded data and various parameter data.

The bus transfer method may be a typical bus standard such as ISA, PCI-Express or AXI, or may employ an original bus scheme, and the scheme is not particularly limited in the present embodiment.

The frame memory 105 stores original image data to be used during the encoding process in the image encoding portion 102, reference image data for performing inter-frame prediction, encoded bit streams or the like.

The CPU 106 is a controller configured to perform, via the CPU bus, hardware control such as activation, termination, or interrupt notification of the image capturing portion 100, the image processing portion 101, and the image encoding portion 102, the recording portion 103 included in the moving image encoding apparatus in the present embodiment.

The flash memory 107, which is a non-volatile memory storing programs to be executed by the CPU 106, parameters or the like, accesses the memory by a fetch operation performed by the CPU 106.

The CPU bus 108, which is a control bus connecting the CPU 106 and various peripherals, may be of a typical bus standard scheme similar to the memory bus 104, or a serial scheme such as the low-speed I2C when there is sufficient processing capacity, and the scheme is not particularly limited.

The operating portion 109, which is formed of various buttons, switches, a touch panel or the like, notifies the CPU 106 of instructions from the user.

In the foregoing, the configuration of the moving image encoding apparatus according to the first embodiment has been described. Subsequently, an internal configuration of, and a process performed by, the image encoding portion 102, which are characteristics of the present embodiment, will be described.

<Image Encoding Portion>

The image encoding portion 102 includes a block dividing portion 200, an intra prediction portion 201, an inter prediction portion 202, an intra/inter determining portion 203, a predictive image generating portion 204, a conversion portion 205, a quantization portion 206, an entropy encoding portion 207, an amount-of-code control portion 208, an inverse quantization portion 209, an inverse conversion portion 210, and a loop filter 211.

The block dividing portion 200 reads image data per unit of encoding target block (CTU) from frame image data (developed image data) stored in the frame memory 105, and further sets an optimal prediction block size for luma and chroma components of the image data.

Although FIG. 2 illustrates a set of two frame memories 105, this is merely for convenience. It is to be understood that FIG. 2 illustrates the address space of the frame memory 105 of FIG. 1 as divided into two parts.

The CTU is divided into CUs (Coding Units) using a quad-tree structure, and each divided CU is applied to subsequent prediction processes such as intra prediction and inter prediction.

The intra prediction portion 201 calculates a correlation of encoding target block images divided by the block dividing portion 200 relative to the plurality of intra predictive images generated from reference pixel data in a periphery of the target blocks. The intra prediction portion 201 then selects an intra prediction scheme with the highest correlation, and notifies to the intra/inter determining portion 202.

The inter prediction portion 202 receives, as reference images, a block image which has been divided by the block dividing portion 200 in a similar manner and image data in an encoded frame in the frame memory 105, and calculates a motion vector by performing motion detection such as pattern matching between pixel data on a block-by-block basis.

The intra/inter determining portion 203 selects and determines a prediction scheme for encoding the block of interest, based on the result output from the intra prediction portion 201 and the inter prediction portion 202.

As a specific selection method, the intra/inter determining portion 203 compares a difference between the encoding target image block and the intra predictive image calculated by the intra prediction portion 201, and a difference between the encoding target image block and the inter predictive image generated from a reference image indicated by a motion vector derived from the inter prediction portion 202. The intra/inter determining portion 203 then selects one with the smaller difference.

Alternatively, the intra prediction portion 201 and the inter prediction portion 202 respectively obtain a prediction error between the determined predictive image and the encoding target image. The intra/inter determining portion 203, after having acquired prediction errors from the intra prediction portion 201 and the inter prediction portion 202, may select the prediction scheme by comparing and evaluating the prediction errors.

In any case, the intra/inter determining portion 203 determines the prediction mode with the smaller difference value to be the encoding prediction mode and outputs to the predictive image generating portion 204.

The predictive image generating portion 204 generates a predictive image in accordance with the prediction mode selected by the intra/inter determining portion 203. The predictive image generating portion 204 then outputs the generated predictive image to a subtractor at a previous stage of the conversion portion 205, and causes a residual image representing the difference between the input image and the predictive image to be calculated. The residual image is output to the adder at a subsequent stage of the inverse conversion portion 210 for generating a local decoded image.

The conversion portion 205 performs spatial resolution conversion of the residual pixel data in each unit of block into the spatial frequency domain.

The quantization portion 206 calculates a quantization coefficient based on the target amount of code, and performs a quantization process on the coefficient data converted into the spatial frequency domain by the conversion portion 205. The quantization portion 206 outputs the quantized coefficient data to both the entropy encoding portion 207 to perform entropy encoding, and the inverse quantization portion 209 to calculate a reference image or a predictive image.

The entropy encoding portion 207 performs information compression on the quantized coefficient data input from the quantization portion 206 or the vector value used for motion prediction in the case of inter prediction, by entropy encoding using deviation of the appearance probability of bit data such as Context Adaptive Arithmetic Coding (CABAC) scheme, adds parameters (header information such as SPS or PPS) required for a decoding process, and outputs to the frame memory 105 by formatting into a predetermined data format. The recording portion 103 described above converts the encoded data stored in the frame memory 105 to a predetermined container format and subsequently stores the encoded data in a recording medium as a file. In addition, the entropy encoding portion 207 outputs, to the amount-of-code control portion 208, the amount of code at a time of block-by-block encoding.

The amount-of-code control portion 208 accumulates the amount of code per block supplied from the entropy encoding portion 207, and calculates the amount of code of the encoded data per 1 picture (frame). The amount-of-code control portion 208 then performs a feedback control of calculating the target amount of code per picture to be encoded next based on bit-rate or buffer model, subsequently determining a quantization parameter for the next picture, and setting it to the quantization portion 206.

The inverse quantization portion 209 multiplies the coefficient data quantized in the quantization portion 206 by the quantization coefficient again to calculate the coefficient data.

The inverse conversion portion 210 performs, on the coefficient data output from the inverse quantization portion 209, a conversion which is inverse to that performed by the conversion portion 205, generates residual pixel data in units of blocks, and outputs the residual pixel data to an adder at a subsequent stage.

The loop filter 211 performs on the image data, which is acquired by adding the image data output from the inverse conversion portion 210 and the predictive image, a filtering process that reduces encoding distortion generated at block boundary, and subsequently outputs the image data to the frame memory 105 as a local decoded image.

It is assumed that the entropy encoding portion 207 and the amount-of-code control portion 208 described above usually perform picture-by-picture control of a single screen, whereas other process blocks are subjected to block-by-block control of predetermined rectangular pixel block.

Particularly, it is assumed in the VVC scheme, to which the present invention is applied, that quantization is performed on a CU-by-CU (Coding Unit) basis, motion vector search of intra prediction and inter prediction is performed on a PU-by-PU (Prediction Unit) basis, and conversion is performed on a TU-by-TU (Transform Unit) basis.

Presented above is the configuration and operation of the image encoding portion 102 of the present embodiment.

<Process Flow>

Next, a process flow of the block dividing portion 200 in the aforementioned apparatus configuration that characterizes the present embodiment will be described, referring to the flowchart of FIG. 3. The process flow is assumed to be triggered by a user operation on the operating portion 109 and executed on a frame-by-frame basis when the apparatus enters a recording state of the captured video.

First, at S301, the block dividing portion 200 acquires a shooting mode provided by a user operation and setting from the operating portion 109 of the moving image encoding apparatus.

The shooting mode is, for example, a nightscape mode, a kids mode, a portrait mode, a sepia mode, a monochrome mode or the like, in which various setting parameters for the image capturing portion 100 such as aperture or white balance, shutter speed, tinge, blurred condition are provided as a combination of predetermined optimal values. It is needless to say that there may be modes other than those described above, the type of which is not particularly limited. Subsequently, at S302, the block dividing portion 200 determines whether or not the block division process is completed for all the CTU blocks for the image data in an encoding target frame. In a case where block division of all the CTU blocks is completed (TRUE at S302), it is determined that the encoding process for the encoding target frame is completed, and the process flow is terminated.

When, on the other hand, the block dividing portion 200 determines that there exists a CTU not being subjected to block division (FALSE at S302), i.e., that there exists a CTU not being encoded, the process proceeds to S303. At S303, the block dividing portion 200 reads the original image data of the target CTU in the input image stored in the frame memory 105.

Although the size of the CTU block is not particularly limited in the present embodiment, expressing the size by the number of horizontal pixels×the number of vertical pixels (or the number of or vertical lines) gives a size of 128×128 pixels or 64×64 pixels, for example, and the block dividing portion 200 is assumed to read the rectangular block image as a unit of reading. Here, the image data format to be read supports a format including a plurality of color components of luma components and chroma components, such as the YCbCr format or the YUV format. In addition, a block-by-block encoding process described below performs each of processing of block pixel data having collected only luma component pixels and processing of block pixel data having collected only chroma component pixels.

In the following, a block division process for the CTU block image data in the block dividing portion 200 described above, will be described.

In the present embodiment, the division process performed by the block dividing portion 200 first performs block division of luma components, and then performs block division of chroma components. S304 is a step of determining whether or not to execute block division of chroma components in order to manage the order of processing. In a case where the target data of the current CTU block division is a luma component block, the block dividing portion 200 sets the determination result of S304 to FALSE and advances the process to S306. At S306, the block dividing portion 200 performs a normal block division process on the CTU of a luma component of interest.

In the normal block division process of the present embodiment, the block dividing portion 200 divides, for example, the rectangular block image into sub-block images of a quad-tree, and derives, for each sub-block region, a variance value indicating the variation of pixel values in the region. The block dividing portion 200 then employs, for the CTU block, a block size before the division in a case where the variance value for all the sub-blocks is equal to or lower than a predetermined threshold value. When, on the other hand, the variance value for any one of the sub-blocks is larger than the threshold value, the block dividing portion 200 similarly perform recursive block division of each sub-block using variance values, by further dividing the sub-block into four branches to acquire smaller sub-block images. However, the smallest size of the divided sub-block is a lower limit size determined in accordance with the standard, or a predetermined size larger than the lower limit size such as 8×8 pixels, for example.

The algorithm of the block division process based on determination using a variance value and a threshold value for each sub-block region described above as the normal block division process is merely an example, and the present invention is not particularly limited thereto, since other approaches may be implemented for block division.

Upon completing block division of the luma component data at S306, the block dividing portion 200 changes the target of block division to a block of the chroma component data and returns the process to S304.

As a result of the foregoing description, a block of a chroma component is the target of division, and therefore the block dividing portion 200 sets the determination result of S304 to TRUE and advances the process to S305.

At S305, the block dividing portion 200 determines whether or not the encoding target input image is in a mode with little change in pixel values of the chroma component, based on the shooting mode information acquired at S301.

In the present embodiment, the mode with little change in the chroma component (suppressing change in the chroma component) is a case where a monochrome mode or a sepia mode is set, and it is characterized that it is possible to determine before the encoding process that the input image is an image data including no or few chroma components when the aforementioned a monochrome mode or a sepia mode is set.

When the aforementioned mode is set (TRUE at S305), in the CTU block, a better compression efficiency is realized by applying the CST scheme which performs block division of the aforementioned luma components and chroma components independently. Therefore, the block dividing portion 200 determines at S307 to perform block division (S307) on chroma component block images to a predetermined size without performing block division down to a small size using a recursively layered quad-tree.

It is considered to be particularly preferable when a result of almost no prediction residual or encoding cost due to DC prediction, skip vectors or the like is generated in the prediction processing at a subsequent stage, or a similar effect is achieved, in an assumption that the predetermined size when performing chroma component block division is, for example, the size of the CTU as it is, or to the block size of a single-layer quad-tree division, and no pixel value change exists in the block.

When, on the other hand, a different mode from that described above is set (FALSE at S305), the block dividing portion 200 advances the process to S308. At S308, the block dividing portion 200 divides the block of the chroma components similarly to the conventional HEVC standard scheme, based on the block division information of the luma component block processed at S306 described above.

When S307 or S308 is executed as the block division of chroma components, the sequence of encoding processes on the block described referring to FIG. 2 is performed. Therefore, the block dividing portion 200 returns the process to S302 for division processing and encoding of the next CTU block, and repeats the flow until the block division and encoding process is completed for all the CTU blocks. In the foregoing, the block division process and the encoding process of the present embodiment has been described.

Block Division Example

A block division example will be described in accordance with the flow described above, in a case where the block division process is performed in the image encoding portion 102, particularly in the block dividing portion 200.

Figure 4A:
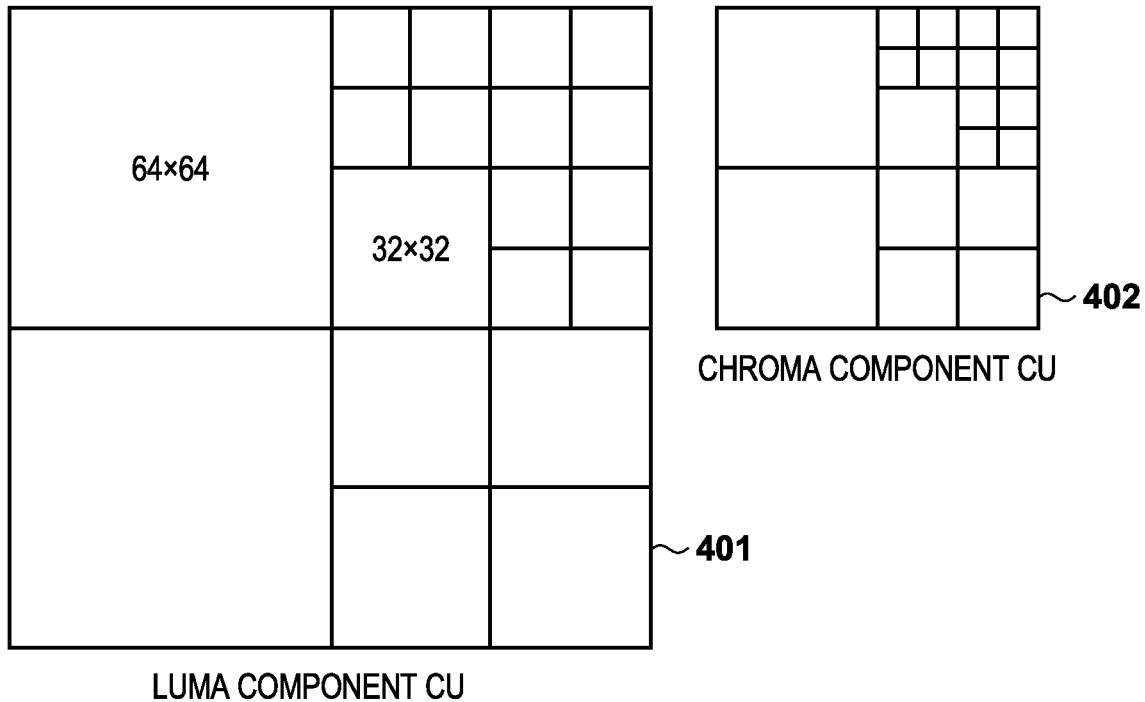
FIGS. 4A and 4B are diagrams each illustrating an example of applying block division according to the first embodiment.
Figure 4B:
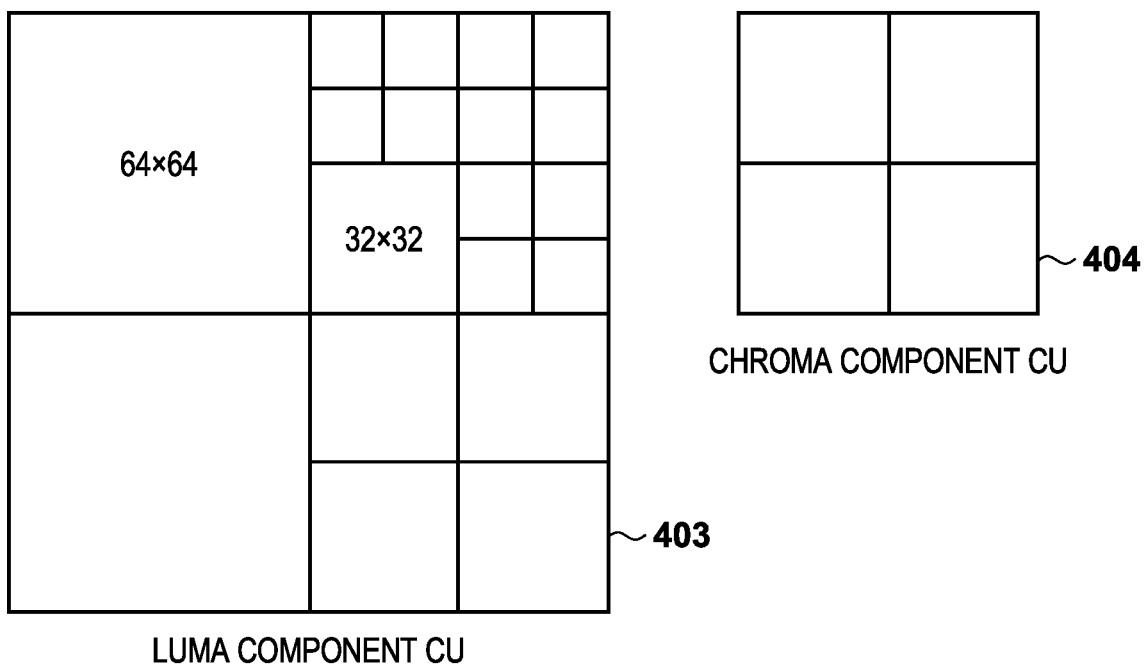

FIGS. 4A and 4B respectively illustrate a case where the chroma format used for sub-sampling of luma components and chroma components is 4:2:0, with the CTU block size being 128×128 pixels.

FIG. 4A illustrates a divided state 401 of a luma component and a divided state 402 of a chroma component in a case where the luma component and the chroma component are subjected to a same block division, as with the conventional HEVC standard. The luma component and the chroma component are divided with a same number of layers. The current block division is performed in a case where a mode with a change in chroma components is selected as the shooting mode, based on the flow explained in FIGS. 1 to 3 described above.

When, on the other hand, a mode with little change in the chroma component (monochrome mode or sepia mode) is selected as the shooting mode, the luma component is performed conventional recursive block division in accordance with the structure of the subject and takes a division state 403 as illustrated in FIG. 4B, whereas the chroma component, which is independent of the luma component due to substantial lack of pixel value gradient, takes a division state 404 by skipping block division, or performing encoding with a predetermined large block size. The number of layers of division of the chroma component is smaller than the number of layers of division of the luma component.

As a result, it is possible to omit redundant transmission of syntax information such as a flag indicating execution of recursive block division, thereby improving the encoding efficiency across CTU blocks as a whole.

Second Embodiment

In the first embodiment described above, a method has been presented in which, when encoding an input image in a shooting mode with definitely no change in pixels of the chroma component such as the monochrome mode or the sepia mode, the CST scheme is applied to all the CTU blocks of the input image and a block division of the chroma component is performed with a predetermined block size, independently of the luma component.

In a second embodiment, instead of commonly applying the CST scheme to all the CTU blocks of the frame in accordance with the user-set shooting mode, a method is implemented as a further different operation. In the method, calculation and comparison, for each block, of the cost of both the conventional block division and the block division applied with the CST scheme are performed, and a more preferable block division is selected to perform encoding.

In the following, a block division process in the block dividing portion 200 according to the second embodiment will be described, referring to the flowchart of FIG. 5. Here, parts of the description that are common to the first embodiment will be omitted as appropriate. In addition, the apparatus configuration implementing the second embodiment, as well as components and functions of the image encoding portion 102, are identical to those of the first embodiment and therefore description thereof will be omitted.

<Process Flow>

Figure 5:
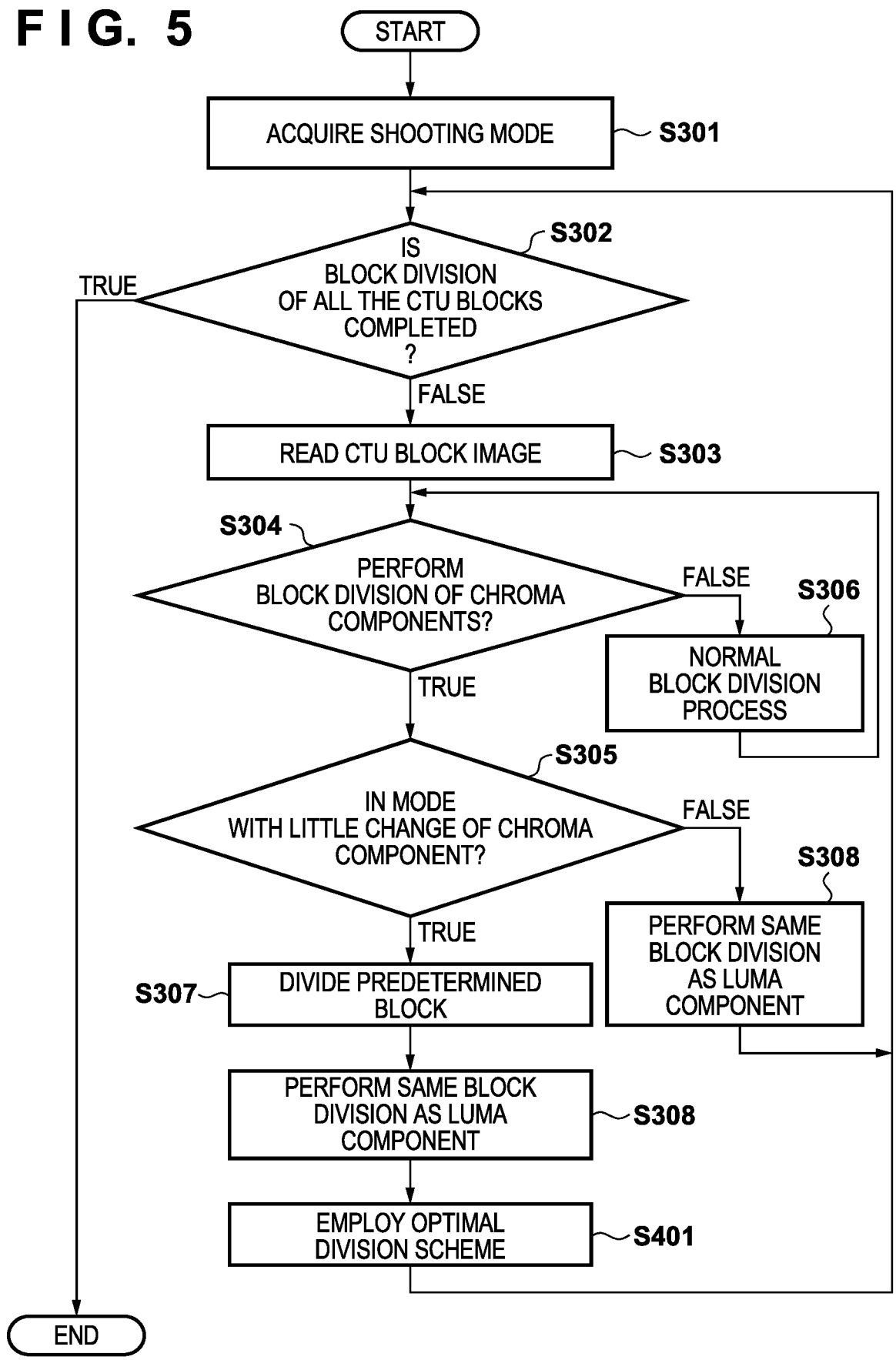
FIG. 5 is a flowchart illustrating a procedure of an encoding process according to a second embodiment.

In FIGS. 5, S301 to S305 are identical to those of the first embodiment. At S305, the block dividing portion 200 determines, when performing CTU block division of the chroma component, whether or not a mode with little change (suppressing change) in the chroma component (monochrome mode or sepia mode) is selected as the shooting mode. Upon determining that a mode with little change in the chroma component is selected (TRUE at S305), the block dividing portion 200 advances the process to S307. At S307, the block dividing portion 200 performs a predetermined block division on a block of the chroma component and advances the process to S308. At S308, the block dividing portion 200 performs the same block division as with the luma component on the block of the chroma component of interest, referring to the information of division performed at S306. Subsequently, at S401, the block dividing portion 200 calculates the cost by the prediction block at a subsequent stage with including the amount of code of syntax information including division flags and number of layers, for both the case of applying the CST scheme and the case of performing the conventional block division, and selects a division scheme exhibiting a higher encoding efficiency. Typically, the block dividing portion 200 performs encoding for each of two block division schemes, and employs a division method that generates a smaller amount of code.

Presented above is the flow of the image division process and image encoding process according to the second embodiment.

Third Embodiment

In the first and second embodiments described above, a method has been presented in which encoding by applying the CST scheme that performs block division of luma components and chroma components independently is performed on an encoding target input image, when a mode value exhibits little change in the chroma component for the encoding target input image, based on a shooting mode preliminarily set by the user before shooting and recording.

A third embodiment is characterized in implementing a further different operation by configuring the image processing portion 101, included in the encoding apparatus described above, to perform, in addition to the development process, image analysis of input image data and notify the image encoding portion 102 of the analysis result. In the following, the third embodiment of the present invention will be described, referring to FIGS. 6 and 7. Here, parts of the description of the third embodiment that are common to the first and the second embodiments described above will be omitted as appropriate.

<Block Diagram>

Figure 6:
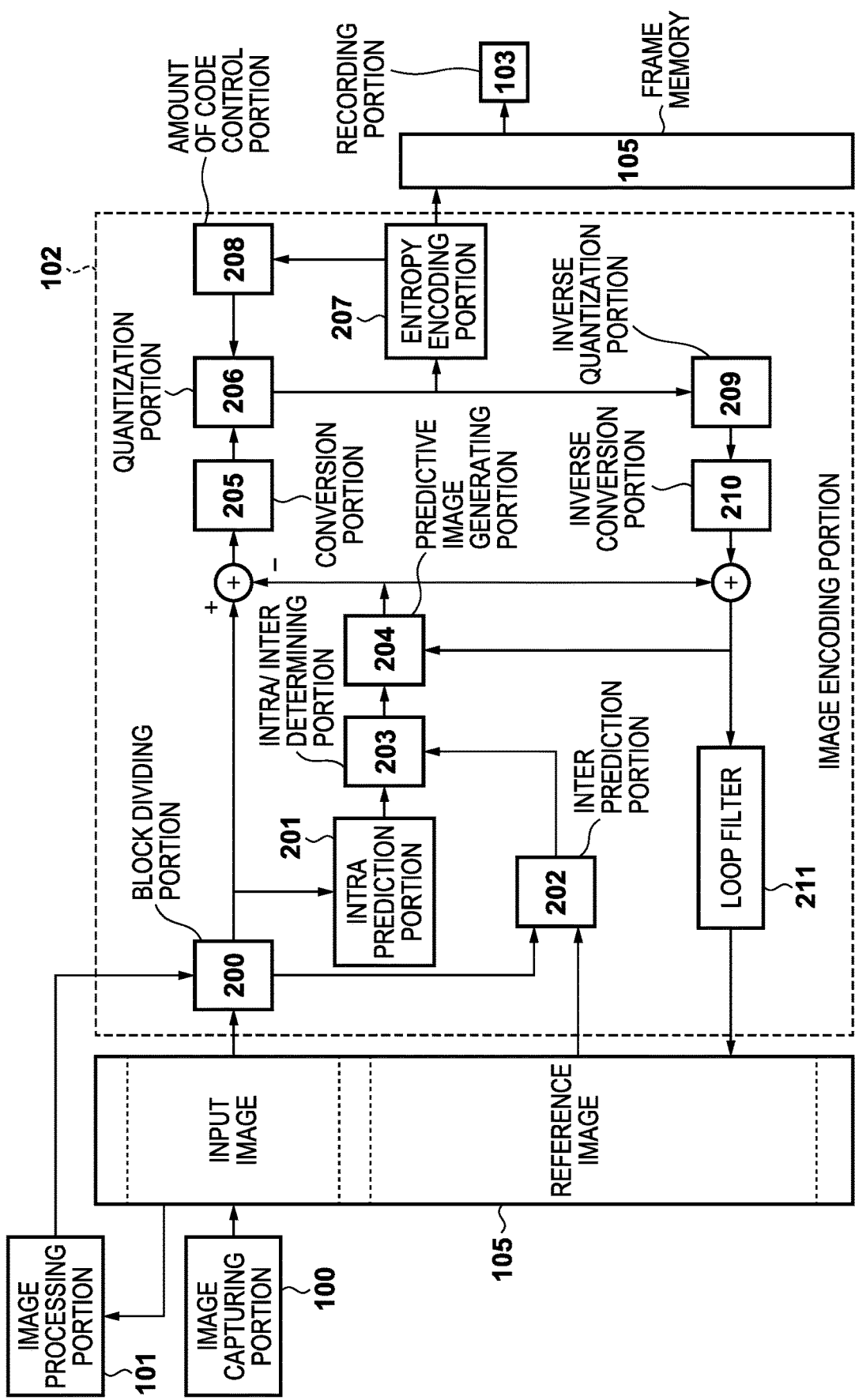
FIG. 6 is a block diagram of an encoding portion according to a third embodiment.

FIG. 6 is a configuration diagram of the image encoding portion 102 and the periphery thereof according to the third embodiment. The image encoding portion 102 according to the third embodiment has substantially the same configuration as the image encoding portion 102 in the first embodiment. The characteristic part of the third embodiment is characterized in that, as illustrated in FIG. 6, the block dividing portion 200 transmits and receives information to and from the image processing portion 101 via an interface such as the CPU bus.

In addition, the image processing portion 101 according to the third embodiment further includes, in addition to the function of development process for the RAW image data and outputting the image to the frame memory 105 as described referring to FIG. 1, a function of analyzing image data characteristics for the image to be output to the frame memory 105 and outputting the analysis result. Characteristic analysis of image data is acquiring, for example, a pixel histogram in the subject image data, and deriving a range between the maximum and the minimum values of the histogram for each color component.

Presenting one example, the image processing portion 101 calculates a pixel histogram of a developed frame image, and calculates, for each of the chroma components Cr and Cb, a difference between the maximum and the minimum values of pixels having frequency equal to or larger than a preliminarily set number. For ease of understanding, the maximum and the minimum values of the chroma Cr are expressed as $Cr\_max$ and $Cr\_min$, and the maximum and the minimum values of the chroma Cb are expressed as $Cb\_max$ and $Cb\_min$.

When the following formulas (1) and (2) are satisfied, the image processing portion 101 determines that the corresponding frame has little change in chroma.

$$Cr\_max - Cr\_min \leq Th\_Cr \qquad (1)$$

$$Cb\_max - Cb\_min \leq Th\_Cb \qquad (2)$$

Here, $Th\_Cr$ and $Th\_Cb$ are preliminarily set positive threshold values. Although a frame-by-frame determination is assumed here, the determination may be performed on a CTU-by-CTU basis.

In response to the analysis result of the image processing portion 101, the block dividing portion 200 can determine, before the encoding process, that the input image exhibits little change in the chroma component, and thus can perform a more precise control than commonly applying the CST scheme to all the CTU blocks in the shooting mode.

In the present embodiment, the characteristic analysis by acquisition of the histogram is merely an example, and the image processing portion 101 is not particularly limited as long as the image processing portion 101 can quantitatively derive an equivalent analysis result. As another analysis method, knowing the location of an in-focus area in the subject image acquired by the image capturing portion 100 as information, an out-of-focus area outside the area is found to be blurred, although depending on the depth of field of the optical portion. Then it is possible to indirectly estimate that a blur in an image indicates an area with little gradient or amount of change of pixel values.

The third embodiment is configured so that the result of analysis executed in the image processing portion 101 described above is transmitted and received between the image processing portion 101 and the image encoding portion 102 either in units of the entire input image frames, or in units of the image areas of the CTU block executed in the block dividing portion 200. When the CPU bus for the analysis results of all the CTU blocks are used, bus traffic may be complicated, and therefore it is conceivable to aggregate the analysis results as bit map information, in which a block with a large change in color is a bit "1" and a block with little change in color is a bit "0", so that the analysis results can be identified per unit of bit, and subsequently access the frame memory 105 in a burst manner. Other block functions are similar to those of the first embodiment and therefore descriptions thereof will be omitted.

<Process Flow>

Figure 7:
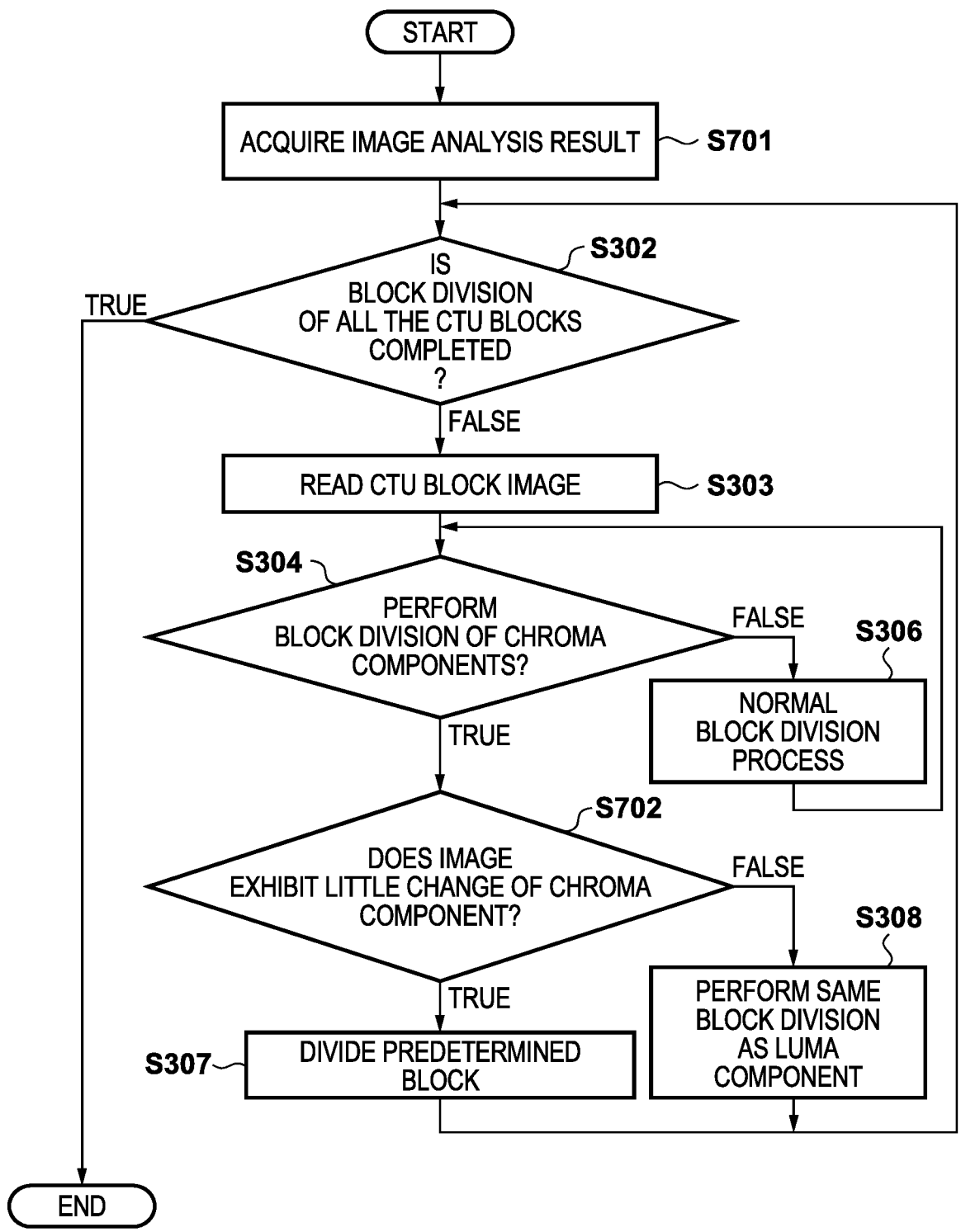
FIG. 7 is a flowchart illustrating a procedure of an encoding process according to the third embodiment.

A division process performed by the block dividing portion that characterizes the third embodiment will be described, referring to the flowchart of FIG. 7. Description of process steps duplicating with those in the first embodiment will be omitted.

First, at S701, the block dividing portion 200 acquires, from the image processing portion 101, the result of image analysis of the encoding target frame. The subsequent S302 to S304 are identical to those of the first embodiment.

At S702, where the process proceeded to the sequence of CTU block division of chroma components, the block dividing portion 200 determines whether or not the input image exhibits little change in chroma components, referring to the analysis result acquired at S701 described above. Subsequently, the block dividing portion 200, upon determining from the analysis result that the image exhibits little change in chroma components (TRUE at S702), advances the process to S307, or upon determining that the image exhibits a large change in chroma components (FALSE at S702), advances the process to S308.

At S307, the block dividing portion 200 performs block division with a predetermined size, applying the CST scheme to the CTU block. When, on the other hand, the process proceeds to S308, the block dividing portion 200 divides the chroma component block similarly to the conventional HEVC standard scheme, based on the block division information of the luma component block processed at S306.

After having performed S307 or S308 with regard to block division of the chroma component, a sequence of encoding processing steps described referring to FIG. 2 are executed on the block. After having performed the encoding, the block dividing portion 200 returns again to S302 and repeats the flow until the block division and encoding process are completed for all the CTU blocks of the input image.

In the foregoing, the flow of the block division process and image encoding process according to the third embodiment has been described.

Fourth Embodiment

In the third embodiment described above, a method has been presented in which a block division of a chroma component is performed with a predetermined block size independently of the block of the luma component, when there is little pixel change in chroma components, based on the result of analysis of the input image in the image processing portion 101.

In a fourth embodiment, instead of commonly applying the CST scheme to all the CTU blocks of the frame in accordance with the analysis result per unit of image frame, a method is implemented as a further different operation. In the method, calculation and comparison, for each block, of the cost of both the conventional block division and the block division applied with the CST scheme are performed, and a more preferable block division is selected to perform encoding.

In the following, the fourth embodiment will be described, referring to the flowchart of FIG. 8. Here, parts of the description of the fourth embodiment that are common to the first to the third embodiments described above will be omitted as appropriate. In addition, the system configuration for implementing the fourth embodiment, as well as components and functions of the image encoding portion 102, are identical to those of the third embodiment and therefore description thereof will be omitted.

<Process Flow>

The image processing portion 101 according to the fourth embodiment calculates a histogram on a block-by-block basis of CTU blocks in an encoding target frame, and determines, for all the CTUs, whether or not the pixels, having a preliminarily set frequency or more, satisfy the formulas (1) and (2) presented above, and supplies the determination result (information indicating presence or absence of a change in the chroma components) to the block dividing portion 200.

Figure 8:
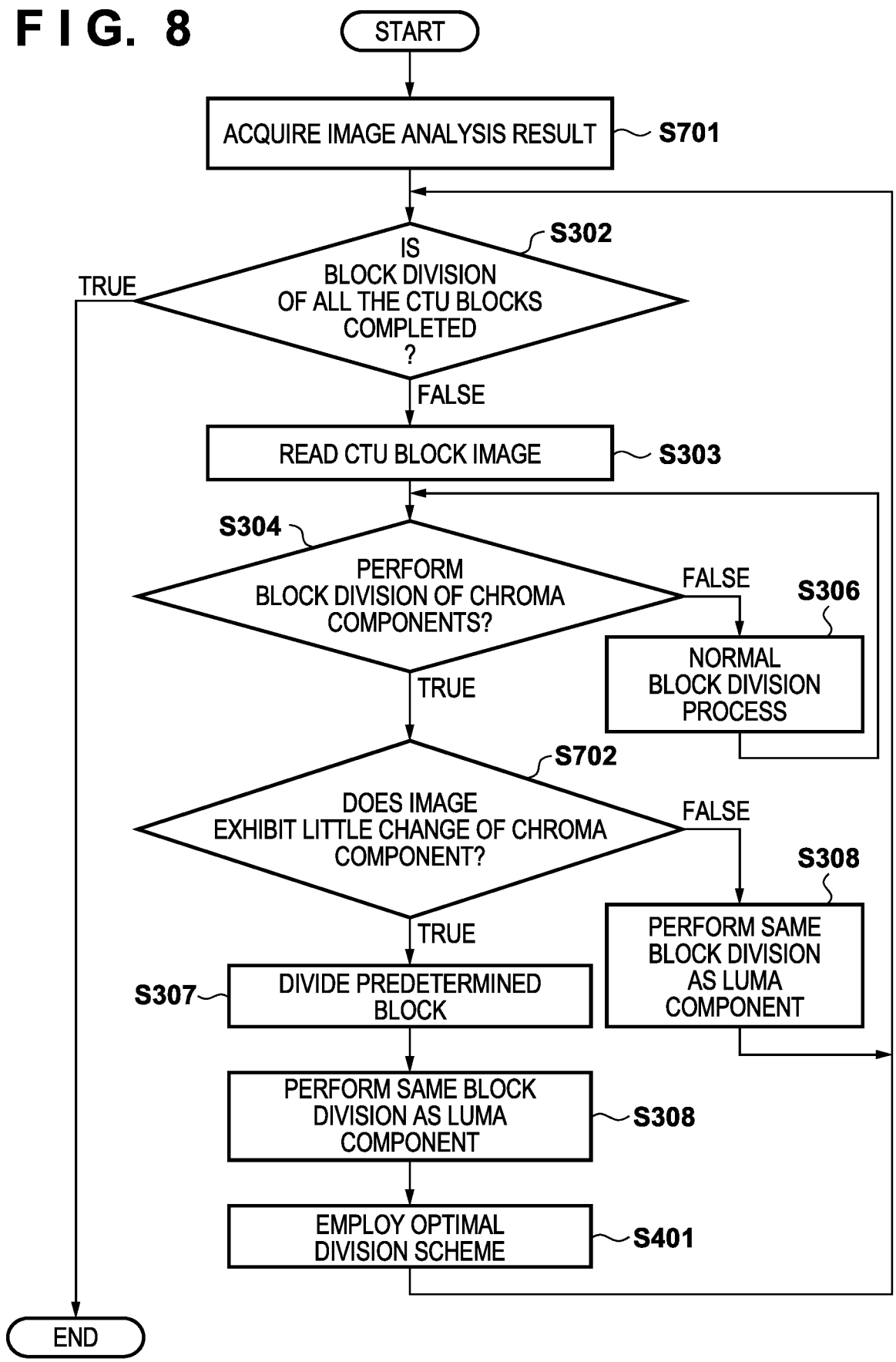
FIG. 8 is a flowchart illustrating a procedure of an encoding process according to a fourth embodiment.

S701, S702, S302, S304, and S306 to S308 in FIG. 8, are identical to those of the third embodiment. However, there are differences such that, at S701 of FIG. 8, the block dividing portion 200 acquires the result of analysis performed by the image processing portion 101 of presence or absence of a change in the chroma component for all the CTU blocks of the encoding target frame, and at S707, determination for each encoding target CTU is performed based on the acquired information.

Upon determining at S702 that the CTU of interest of the chroma component exhibits little change in chroma components, the block dividing portion 200 applies the CST scheme to the chroma component blocks and performs a predetermined block division. Furthermore, at S308, the block dividing portion 200 performs the conventional block division same as that performed for luma components, referring to the information of division performed at S306. Subsequently, at S401, the block dividing portion 200 calculates the cost in the prediction block with including the amount of code of syntax information including division flags and number of layers for both the case of applying the CST scheme and the case of performing the conventional block division, and selects a division scheme exhibiting a higher encoding efficiency. Presented above is the image encoding process flow according to the fourth embodiment.

Fifth Embodiment

In the third and the fourth embodiments described above, a method has been presented in which encoding is performed by applying the CST scheme that performs block division of luma components and chroma components independently when there is little pixel change in chroma components in the input image data of the encoding target, based on the result of analysis of the image characteristics in the image processing portion 101.

In contrast, in a fifth embodiment, not only embedding identification information in a compressed and encoded stream for determination by a decoder side defined by the standard, a method of defining and storing the identification information additionally in an upper-level file container layer is implemented as a further different operation, the identification information indicating whether or not block division using the CST scheme in the aforementioned embodiments of the present invention is applied.

In the following, the fifth embodiment will be described, referring to the flowchart of FIG. 9. Here, parts of the description of the fifth embodiment that are common to the first to the fourth embodiments described above will be omitted as appropriate. In addition, the system configuration for implementing the fifth embodiment, as well as components and functions of the image encoding portion 102, are identical to those of the fourth embodiment and description thereof will be omitted.

<Process Flow>

Figure 9:
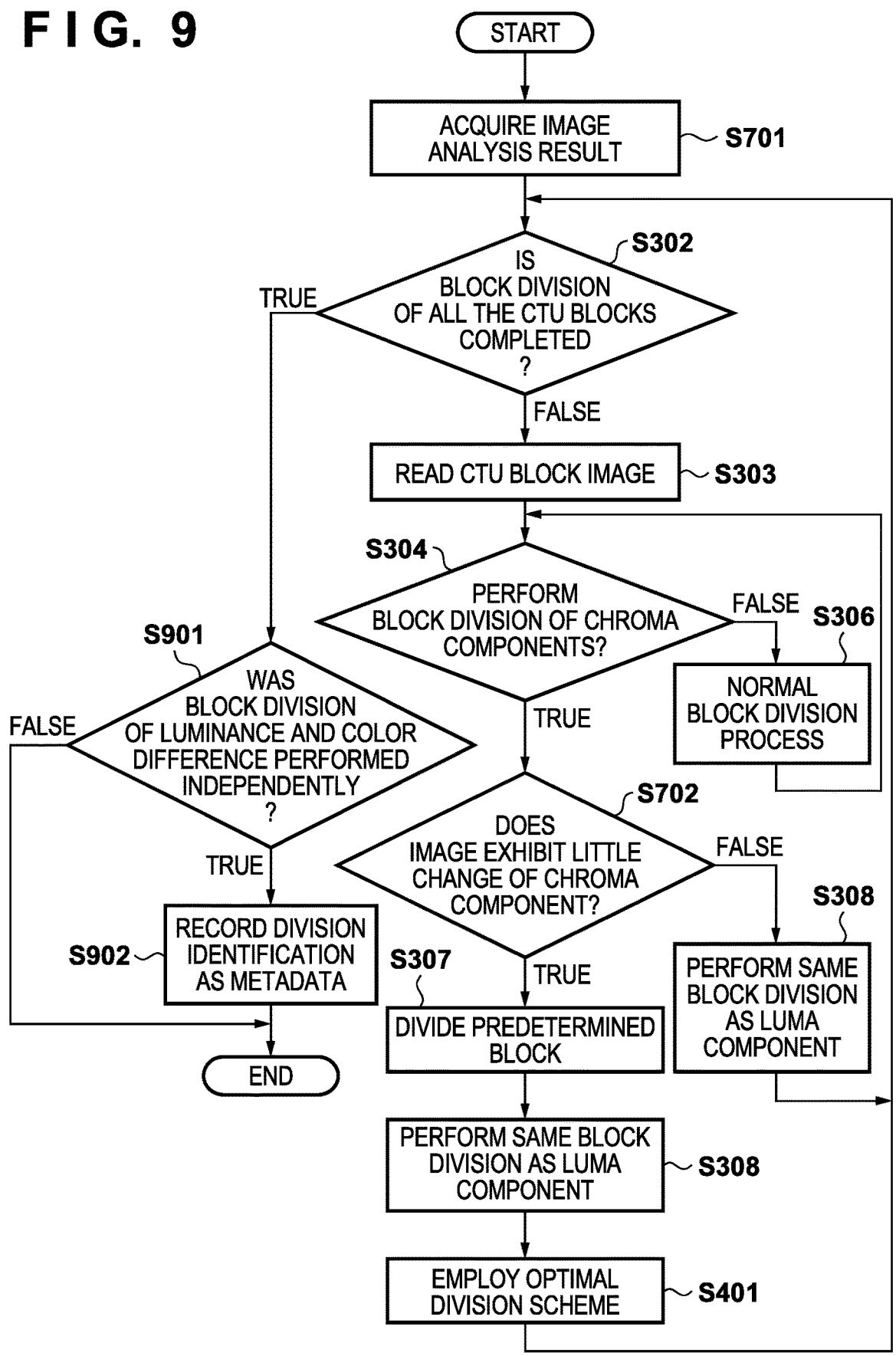
FIG. 9 is a flowchart illustrating a procedure of an encoding process according to a fifth embodiment.

In FIG. 9 illustrating the characteristics of the fifth embodiment, steps except S901 and S902 are identical those of the fourth embodiment and descriptions thereof will be omitted.

Upon completing block division of all the CTU blocks and completing the encoding process of all the CTUs (TRUE at S302), the block dividing portion 200 advances the process to S901. At S901, the block dividing portion 200 determines whether or not block division is performed, on the encoded frame image, with applying the CST scheme which performs block division of luma components and chroma components independently to the perform encoding process. Upon determining that the CST scheme is applied (TRUE at S901), the block dividing portion 200 notifies the CPU 106 of the determination. The CPU 106 controls the image encoding portion 102 to record identification information, indicating that the CST scheme is applied, as a container structure of an MP4 data, in a parameter field (e.g., udta atom) defined as user metadata, when the recording portion 103 records the encoded data of the encoded image of the frame in the recording medium 150 such as an SD card.

Storing the aforementioned identification information as a container file allows for determining whether or not playback compatibility is supported, before actually decoding the encoded stream, in a case where the player or decoder apparatus does not support a decoding process of CST scheme that is newly employed in the VVC standard.

Presented above is the image encoding process flow according to the fifth embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-135803, filed Aug. 23, 2021, which is hereby incorporated by reference herein in its entirety.

What is claimed is:

1. An encoder comprising:
an input portion configured to be input an encoding target image acquired from an image capturing portion;
wherein the encoder is arranged to:
divide the encoding target image into coding units, the coding units including an encoding block of a luma signal and an encoding block of a chroma signal;
acquire characteristics of chroma components of the encoding target image; and
further divide the encoding block of the luma signal and the encoding block of the chroma signal into encoding blocks of a same division structure or different division structures, in accordance with the acquired shooting condition,
wherein the characteristics of chroma components is a histogram calculated from the encoding target image, and
wherein the encoding block of the luma signal and the encoding block of the chroma signal are further divided into:
encoding blocks of the same division structure when the histogram exhibits a smaller amount of change in chroma than a predetermined amount; and
encoding blocks of the different division structures when the histogram exhibits a larger amount of change in chroma than a predetermined amount.

2. The encoder according to claim 1, wherein a number of division layers of the chroma component is smaller than a number of division layers of the luma component when the encoding block of the luma signal and the encoding block of the chroma signal are divided into encoding blocks of different division structures.

3. An image encoding method comprising:
(a) inputting an encoding target image acquired from an image capturing portion;

(b) dividing the encoding target image into coding units, the coding units including an encoding block of a luma signal and an encoding block of a chroma signal;

(c) acquiring characteristics of chroma components of the encoding target image; and (d) further dividing the encoding block of the luma signal and the encoding block of the chroma signal into encoding blocks of a same division structure or different division structures, in accordance with the acquired shooting condition, wherein the characteristics of chroma components is a histogram calculated from the encoding target image, and wherein (d) the further dividing includes:

encoding block of the luma signal and the encoding block of the chroma signal are further divided into encoding blocks of the same division structure when the histogram exhibits a smaller amount of change in chroma than a predetermined amount; and encoding block of the luma signal and the encoding block of the chroma signal are further divided into encoding blocks of the different division structures when the histogram exhibits a larger amount of change in chroma than a predetermined amount.

4. The method according to claim 3, wherein a number of division layers of the chroma component is smaller than a number of division layers of the luma component when the encoding block of the luma signal and the encoding block of the chroma signal are divided into encoding blocks of different division structures.

5. A non-transitory computer-readable storage medium storing a program which, when read and executed by a computer, caused the computer to execute the steps of an image encoding method, the method comprising:

(a) inputting an encoding target image acquired from an image capturing portion;

(b) dividing the encoding target image into coding units, the coding units including an encoding block of a luma signal and an encoding block of a chroma signal;

(c) acquiring characteristics of chroma components of the encoding target image; and (d) further dividing the encoding block of the luma signal and the encoding block of the chroma signal into encoding blocks of a same division structure or different division structures, in accordance with the acquired shooting condition, wherein the characteristics of chroma components is a histogram calculated from the encoding target image, and wherein (d) the further dividing includes:

encoding block of the luma signal and the encoding block of the chroma signal are further divided into encoding blocks of the same division structure when the histogram exhibits a smaller amount of change in chroma than a predetermined amount; and encoding block of the luma signal and the encoding block of the chroma signal are further divided into encoding blocks of the different division structures when the histogram exhibits a larger amount of change in chroma than a predetermined amount.

* * * * *